US005656227A

United States Patent [19]

Foster

[11] Patent Number: 5,656,227

[45] Date of Patent: Aug. 12, 1997

[54] METHOD OF MAKING A ONE-PIECE TRIGGER SPRAYER HOUSING

[75] Inventor: Donald D. Foster, St. Charles, Mo.

[73] Assignee: Contico International, Inc., St. Louis, Mo.

[21] Appl. No.: 478,895

[22] Filed: Jun. 7, 1995

Related U.S. Application Data

[63] Continuation-in-part of Ser. No. 279,592, Jul. 22, 1994, Pat. No. 5,590,834.

[51] Int. Cl.$^6$ .............................. B05B 11/02; B29C 45/40

[52] U.S. Cl. .......................... 264/328.1; 239/333; 249/58; 249/145; 264/334

[58] Field of Search ..................................... 239/333, 289; 249/64, 145, 58; 264/328.1, 328.8, 334; 425/DIG. 58, 577

[56] References Cited

U.S. PATENT DOCUMENTS

| | | | |
|---|---|---|---|
| Re. 33,235 | 6/1990 | Corsette | 222/383 |
| D. 337,945 | 8/1993 | Warner | D9/448 |
| 3,061,202 | 10/1962 | Tyler | 239/333 |
| 3,076,608 | 2/1963 | Valles | 239/526 |
| 3,474,938 | 10/1969 | Clevenger | 222/318 |
| 3,650,473 | 3/1972 | Malone | 239/333 |
| 3,840,157 | 10/1974 | Hellenkamp | 222/309 |
| 4,072,252 | 2/1978 | Steyns et al. | 222/341 |
| 4,153,203 | 5/1979 | Tada | 239/333 |
| 4,230,277 | 10/1980 | Tada | 239/333 |
| 4,310,107 | 1/1982 | Wesner | 222/214 |
| 4,346,821 | 8/1982 | Wesner et al. | 222/153 |
| 4,448,355 | 5/1984 | Roman | 239/526 |
| 4,606,480 | 8/1986 | Rodriguez Gazulla | 222/341 |
| 4,640,444 | 2/1987 | Bundschuh | 222/321 |
| 4,915,304 | 4/1990 | Campani | 239/473 |
| 4,944,431 | 7/1990 | Blake | 222/276 |
| 4,955,511 | 9/1990 | Blake | 222/321 |
| 4,958,754 | 9/1990 | Dennis | 222/383 |
| 4,982,900 | 1/1991 | Blake | 239/333 |
| 5,172,836 | 12/1992 | Warner | 222/383 |
| 5,222,637 | 6/1993 | Giuffredi | 222/336 |
| 5,228,602 | 7/1993 | Maas et al. | 222/340 |
| 5,244,126 | 9/1993 | Geier | 222/383 |
| 5,385,302 | 1/1995 | Foster et al. | 239/333 |

FOREIGN PATENT DOCUMENTS

| | | | |
|---|---|---|---|
| 87/01618 | 3/1987 | WIPO | B05B 1/12 |

*Primary Examiner*—Jill L. Heitbrink

*Attorney, Agent, or Firm*—Howell & Haferkamp, L.C.

[57] ABSTRACT

A method of molding a trigger sprayer one-piece housing includes molding the housing with a shroud having sides which extend rearward to an integral ergonomic saddle with a surface configured to rest upon the user's hand during trigger sprayer actuation. The one-piece housing is molded integrally with an outlet barrel, a pump cylinder, a vent passage cylinder, and a vertical inlet passage receptacle using the same three-piece mold.

20 Claims, 7 Drawing Sheets

METHOD OF MAKING A ONE-PIECE TRIGGER SPRAYER HOUSING

This application is a continuation-in-part of U.S. patent application Ser. No. 08/279,592, filed on Jul. 22, 1994, now U.S. Pat. No. 5,590,834.

BACKGROUND OF THE INVENTION

This invention is related to the field of trigger dispensers, also known as trigger sprayers. The invention is particularly directed to a trigger sprayer having a housing with numerous features integrally molded therein including a shroud having sides which extend rearward to an integral ergonomic saddle having a surface configured to rest upon the user's hand during trigger sprayer actuation.

There are numerous patents that have issued on trigger dispensers of the general type to which this invention relates. The patents discussed below exemplify such prior art trigger dispenser patents. Generally, a trigger dispenser of the type involved here is a relatively low cost pump device which may be grasped in the hand and has a pump chamber which is operable by pulling a trigger to pump liquid from a container and through a nozzle at the front of the dispenser.

Such trigger dispensers may have a variety of features that have become common and well known in the industry. For example, the dispenser may have a vent system to prevent a vacuum from developing in the container as liquid is removed therefrom. If no vent system is included, the vacuum eventually prevents the trigger dispenser from pumping the liquid from the container. Many of these vent systems are connected to the trigger such that as the trigger is actuated, the vent is repeatedly opened and closed at appropriate points in the pumping cycle to relieve the vacuum.

U.S. Pat. Nos. 3,840,157 and 5,222,637 disclose trigger dispensers having ergonomic saddles with surfaces configured to rest upon the user's hand during trigger sprayer actuation. However, the particular configurations do not employ shrouds, thus making the functional structures of the trigger dispensers visible to the user. A smoother, more streamlined configuration is more aesthetically desirable. As a result, shrouds are typically used to give the housing a more streamlined appearance.

U.S. Pat. No. 4,958,754 discloses a trigger dispenser which has a housing with an integrally molded shroud. This shroud makes the housing more streamlined and appealing. The shroud is integrally molded with the housing to reduce assembly costs by eliminating a separate component. The shroud includes a saddle which rests on the user's hand during use to aid the user in grasping the dispenser. However, molding constraints require that the bottom of saddles of this type be open, and therefore a surface is not provided on the saddle to rest upon the user's hand during trigger sprayer actuation. Rather, the edges of the saddle surrounding the opening rest upon the user's hand. When a load is distributed over a relatively small area, the stress associated with that load is increased. In this instance since the stress is in the user's hand, the user's comfort level is reduced by a reduction in loaded area. Thus, while sprayers of this type provide an aesthetic housing with numerous advantages, the level of comfort is less than optimal.

U.S. Pat. No. 5,228,602 discloses yet another trigger dispenser which is partially shrouded. The forward section of this dispenser is shrouded so as to provide a streamlined appearance. Depending from the rearward side of the shroud is a band which forms an ergonomic saddle. Although this saddle has a surface to rest upon the user's hand during trigger sprayer actuation, the overall appearance of the housing is not streamlined because the sides of the shroud do not extend rearward over the saddle. Thus, as with the aforementioned patents, this patent does not solve the problem of providing a one-piece shrouded housing with a totally streamlined appearance and an ergonomic saddle with a surface configured to rest upon the user's hand.

Part of the difficulty in producing a housing having an integral shroud with a totally streamlined appearance as well as a surface to rest upon the user's hand is the constraints of plastic molding. Plastic parts must be molded with relatively thin cross-sections to prevent unsightly shrinkage voids. Thus, plastic parts are frequently made hollow to keep the cross-sectional thicknesses thin. However, a hollow cannot be created within a trigger dispenser housing without leaving an opening somewhere in the housing for the mold to withdraw from the hollow. If the opening is put in the housing at the bottom of the saddle, then the saddle surface is broken by the opening. As a result, the edges of the opening rest upon the user's hand and cause a reduction in comfort. Alternatively, the opening may be placed at the top or at the side but this reduces the aesthetic appeal of the trigger dispenser which is the purpose of the shroud in the first place. Thus, in the prior art where a surface for the user's hand has been provided in the saddle, aesthetics have been sacrificed, and where aesthetics have not been sacrificed, a surface for the hand has not been provided.

The present invention overcomes these disadvantages of the prior art trigger dispensers and provides a unique trigger dispenser having a housing with an integral shroud which has a totally streamlined appearance and a surface to rest upon the user's hand during the trigger dispenser actuation.

SUMMARY OF THE INVENTION

The trigger dispenser of the present invention has a one-piece housing which includes an integral shroud. The shroud has sides which extend rearward to an integral ergonomic saddle having a surface configured to rest upon the user's hand during trigger sprayer actuation. The upper surface of this saddle is open, but ribs extend laterally between the sides of the shroud to both stiffen the saddle and enhance the aesthetics of the housing. The result is the trigger dispenser has a streamlined shroud with a pleasing appearance.

In the preferred embodiment, several other features are also integrally molded into the one-piece housing. These features include an output barrel and a primary valve seat. A pump cylinder which forms a part of a pump chamber is also integrally molded to the housing, as are a valve seat and passage which form the vent system. Additionally, a receptacle is formed in the housing to receive an inlet passage assembly. The resulting structure is a low cost unit which provides enhanced comfort for the user without sacrificing aesthetic appeal.

DETAILED DESCRIPTION OF THE PREFERRED EMBODIMENT

Figure 1:
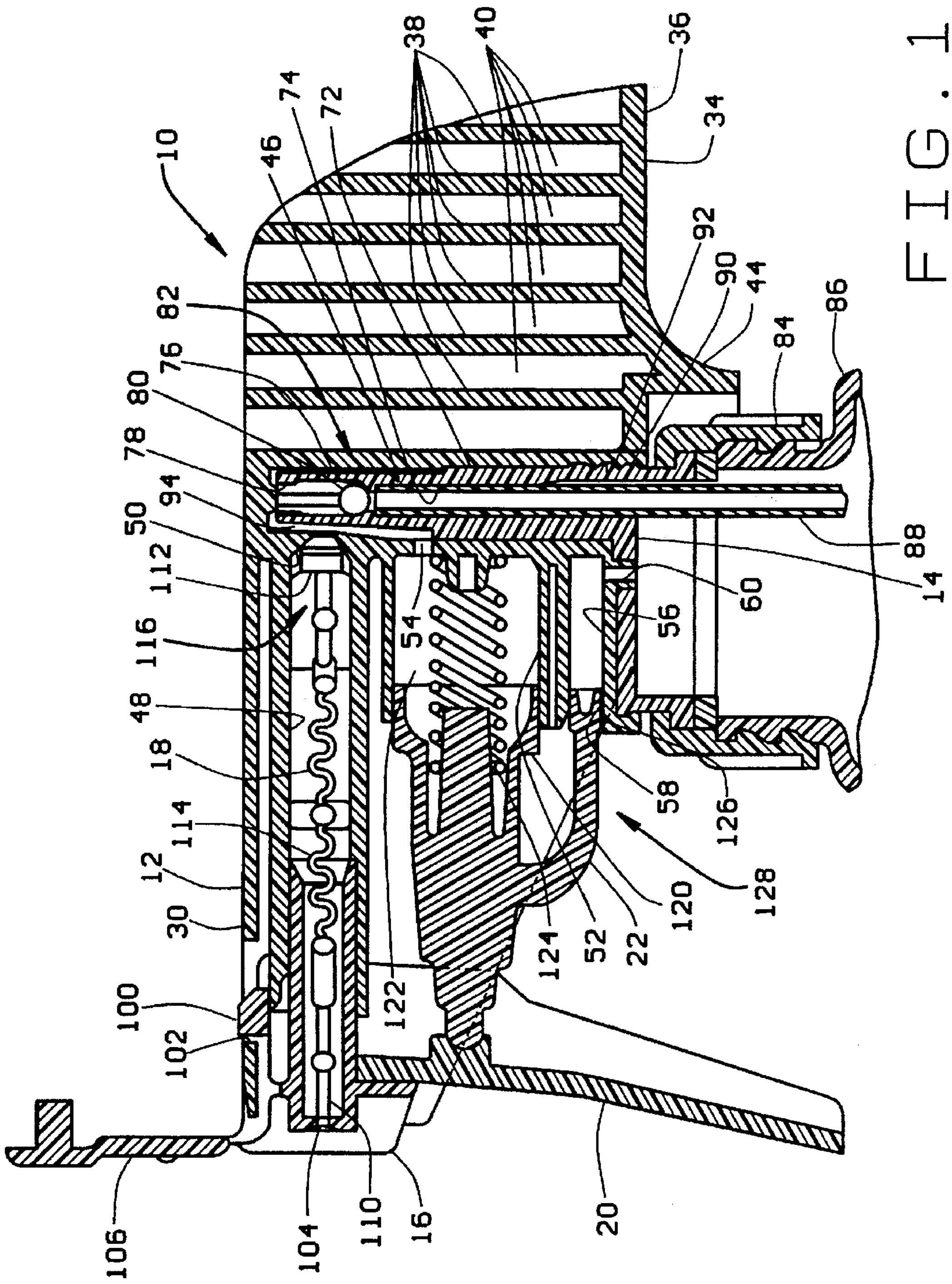
FIG. 1 is a view in section of the preferred embodiment of the one-piece housing of the present invention.

A trigger dispenser 10 is assembled from the one-piece housing 12 of the present invention. Other major components of the trigger dispenser include an inlet passage assembly 14, a nozzle assembly 16, a spinner assembly 18, a trigger 20, and a plunger 22.

Figure 2:
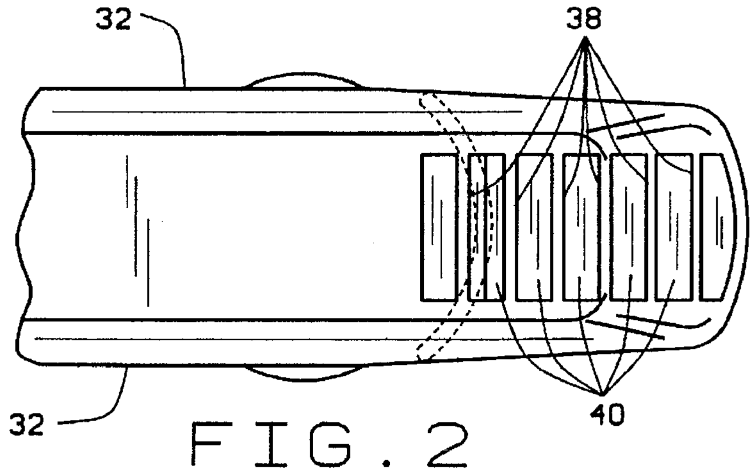
FIG. 2 is a top plan view of the saddle portion of the one-piece housing.
Figure 3:
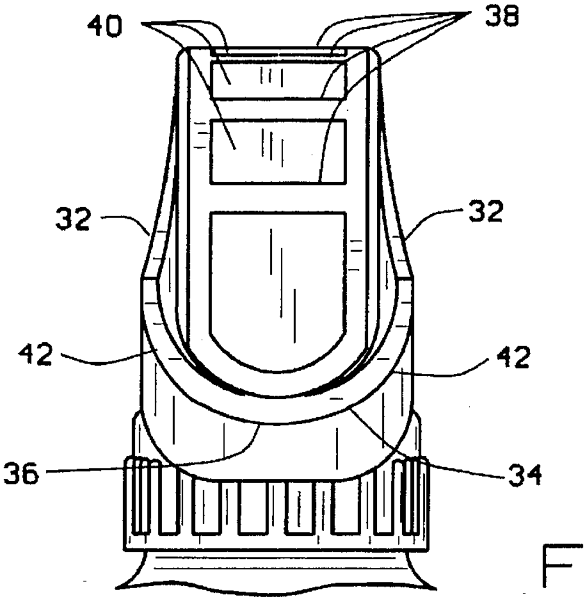
FIG. 3 is a rear elevation view of the saddle portion of the one-piece housing.
Figure 4:
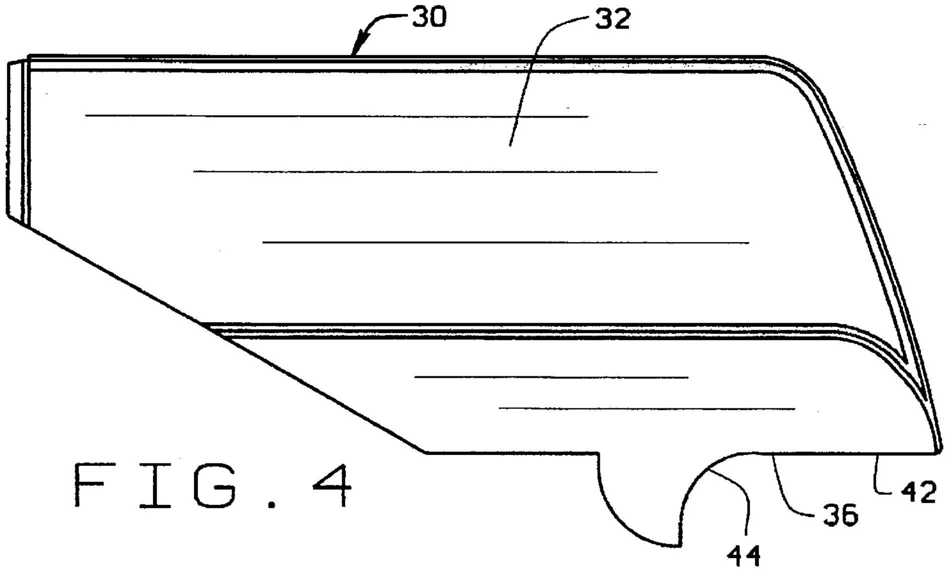
FIG. 4 is a side elevation view of the one-piece housing.
Figure 5:
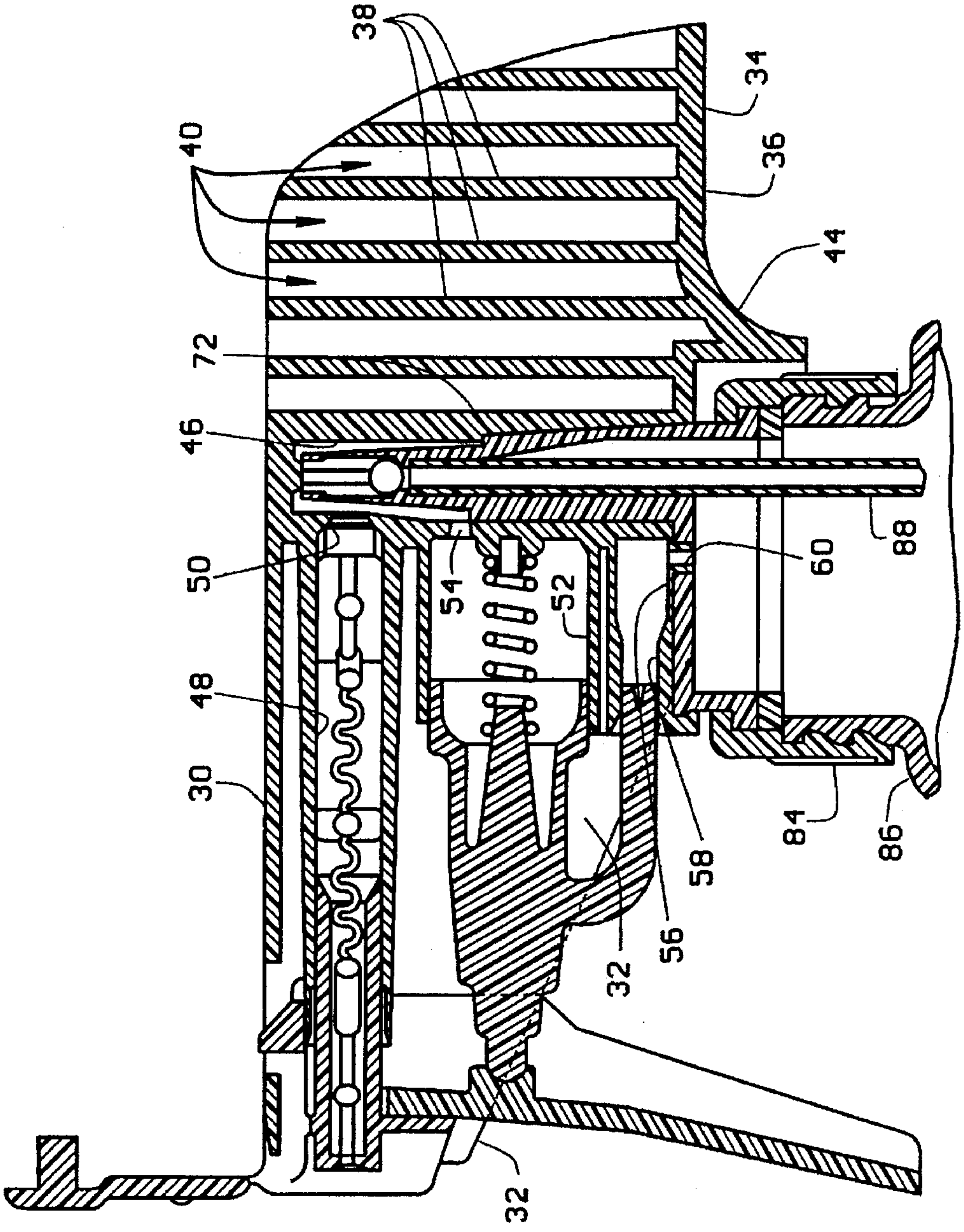
FIG. 5 is a cross-section view of the one-piece housing formed according to the method of the invention.

The housing 12 has a shroud 30 which gives a streamlined appearance to the trigger dispenser. As best seen in FIG. 3, the sides 32 of the shroud extend rearward to an integral ergonomic saddle 34 which rests upon the web of the user's hand between the index finger and thumb during trigger sprayer actuation. At the bottom of the saddle 34 is a surface 36 which actually contacts the user's hand. Immediately above this surface 36 are several ribs 38 which extend laterally between the sides 32 of the shroud. As best seen in FIG. 2, these ribs 38 in combination with the openings 40 formed therebetween give an appealing appearance to the housing 12 and also provide openings through which the mold may be extracted from the hollow interior. The intersections of the surface 36 and the sides 32 have generous radii 42 to further enhance the user's comfort. In addition, as seen in FIG. 1 the forward edge of the surface 36 has a fillet 44 which even further improves the user's comfort.

Immediately in front of the saddle 34 and ribs 38 is a cylindrical recess which forms a receptacle 46 for the inlet passage assembly 14. Near the top of this receptacle 46 is an opening which extends into a horizontal outlet barrel 48 through which liquid is dispensed. A primary valve seat 50 is integrally molded into the rearward end of the outlet barrel 48 immediately in front of the inlet passage assembly receptacle 46. A pump cylinder 52 is located below the outlet barrel 48 and spaced therefrom to reduce the cylinder wall thicknesses and inhibit shrinkage voiding. At the rearward end of the pump cylinder 52 is a pump chamber opening 54 which permits liquid to enter and exit the pump cylinder 52. Below the pump cylinder 52 is a vent passage cylinder 56 which is spaced from the pump cylinder 52 to reduce the required cylinder wall thicknesses to inhibit shrinkage voiding. At the forward end of the vent passage cylinder 56 is a vent valve seat 58. On the lower wall of the vent passage cylinder 56 near the rearward end is a vent opening 60. It should be noted that although the term "cylinder" is used to describe the pump and vent features, this is not intended to be a geometric limitation. Cylinder is used to mean any tubular configuration. Nonetheless, the cylinders do have circular cross-sections in the preferred embodiment.

The inlet passage assembly 14 has a vertical tubular extension 72 which is received directly into the receptacle 46. A dip tube receptacle 74 is formed in the lower portion of the tubular extension 72. Immediately above this receptacle 74 is a secondary valve seat 76. Keepers 78 protrude into the hollow of the tubular extension 72 adjacent the top thereof. A ball valve body 80 is retained between the keepers 78 and the secondary valve seat 76 to form the secondary valve 82.

At the lower end of the inlet passage assembly 14 is a closure means 84. Although numerous fastener types could be used, the closure 84 depicted in the drawing figures is a typical screw-type fastener. This closure 84 is used to fasten the trigger dispenser to a container 86 in which the liquid is held for dispensing. A dip tube 88 extends from the dip tube receptacle 74 of the inlet passage assembly 14 to the bottom of the container 86. The inlet passage assembly 14 is retained within the inlet passage means receptacle 46 by mating ridges 90 and grooves 92. An annular passage 94 is formed between the inlet passage assembly 14 and receptacle 46 to permit liquid to flow from the secondary valve 82 to the pump chamber opening 54.

The nozzle assembly 16 is received in the forward end of the outlet barrel 48 and is retained in place by a detent 100 which protrudes through an opening 102 formed in the shroud 30. At the forward end of the nozzle assembly 16 is an orifice 104 through which liquid is dispensed. A hinged sealing means 106 is provided on the nozzle assembly 16 to seal the orifice 104 and prevent leakage therefrom during shipment and storage.

The spinner assembly 18 is retained within the outlet barrel 48 behind the nozzle orifice 104. The spinner assembly 18 is comprised of a spinner head 110 which imparts a swirl to the liquid as it exits the orifice 104 to improve the spray pattern. At the rearward end of the spinner assembly 18 is a valve body 112 which is biased against the primary valve seat 50 by a spring section 114 to form the primary valve 116.

A piston 120 formed in the plunger 22 reciprocates within the pump cylinder 52 to form a pump chamber 122. A coil spring 124 biases the piston 120 in the extended position as shown in FIG. 1 so as to increase the internal volume of the pump chamber 122. Extending from the plunger 22 is a popper 126 which reciprocates within the vent passage cylinder 56 and seats against the vent valve seat 58 to form a vent valve 128. The trigger 20 rests against the plunger 22 and is hinged within the housing 12 to provide leverage for the user to actuate the plunger.

To operate the trigger dispenser, the user grasps the trigger dispenser in his hand such that the saddle is resting on the web of the hand between the thumb and index finger and the fingers are wrapped around the trigger. The user pulls the trigger which causes the plunger to move rearward within the pump cylinder such that the interior volume of the pump chamber is reduced, thereby forcing liquid in the pump chamber through the pump chamber opening and into the annular passage. The secondary valve is forced closed and the primary valve is forced open by the fluid pressure. Thus, fluid is forced through the outlet barrel, past the spinner head, and out the nozzle orifice. When the user releases the trigger, the coil spring forces the plunger forward thereby expanding the interior volume of the pump chamber and causing a reduction in pressure in the pump chamber which closes the primary valve and opens the secondary valve. Thus, liquid is drawn from the container, through the dip tube, past the secondary valve, through the annular passage, and into the pump chamber as the pump chamber expands thereby filling the pump chamber with liquid which may be dispensed upon the following contraction of the pump chamber as described above.

As liquid is removed from the container, a vacuum develops in the container. If this vacuum were not corrected, eventually the trigger dispenser effectiveness would be reduced or would cease entirely. Thus, the vent system is included in the trigger sprayer. When the trigger is pulled, the popper on the plunger is unseated from the vent valve seat thereby opening the vent valve and permitting ambient air to enter the vent valve, traverse the vent passage cylinder, and enter the container through the vent opening. When the plunger is in the forward position, the popper seats against the vent valve seat to close off this passageway.

The trigger sprayer housing 12 of the present invention is unique in that it has a one-piece construction. The one-piece construction includes a liquid discharge chamber or outlet barrel passage 48, the pump chamber cylinder 52, the vent chamber cylinder 56, and the inlet passage chamber 46. These four interior chambers of the trigger sprayer housing are all formed integrally in the one-piece housing construction. The four interior chambers are also covered over by a decorative shroud 30 that is also integrally formed in the one-piece housing construction.

The shroud 30 includes a top panel and opposite left and right side panels 32 that surround the outlet barrel chamber 48, the pump chamber 52, the vent chamber 56 and the inlet passage chamber 46 and shield these four chambers from view from the opposite left and right sides of the trigger sprayer housing. The shroud also includes the hollow cavities 40 formed at the rearward end of the housing between the shroud side panels 32 and above the shroud bottom panel or saddle 34. The exterior surfaces of the two shroud side panels 32 extend rearwardly from the four interior chambers formed in the forward portion of the trigger sprayer housing over the opposite sides of the cavities and the saddle formed in the rearward portion of the trigger sprayer housing. The plurality of vertical ribs 38 formed in the hollow cavity 40 at the rearward portion of the trigger sprayer housing space the rearward portions of the two side panels 32 from each other. The cavities 40 formed in the rearward portion of the sprayer housing also enable the insertion of a mold section into the rearward portion of the housing for molding the saddle surface 36 on the underside of the housing rearward portion.

The one-piece housing construction that comprises the horizontally oriented outlet barrel chamber 48, pump chamber 52, vent chamber 56 and the vertically oriented inlet passage chamber 46 and the ergonomically shaped saddle surface 36 is molded according to a unique method of construction that enables the economic manufacture of the trigger sprayer of the invention. According to the construction method of the invention, the three horizontally oriented interior chambers, the one vertically oriented interior chamber, the hollow cavity and the ergonomic saddle surface beneath the cavity are all integrally molded into the one-piece trigger sprayer housing with each of these features being covered over by the aesthetically pleasing appearance of the shroud side panels 32. The ability to mold the interior chambers of the housing with the saddle surface and hollow cavity above the saddle surface and the shroud covering over the exterior of the trigger sprayer housing according to the method of the invention provides an economically manufactured trigger sprayer housing with a pleasing exterior surface.

Figure 6:
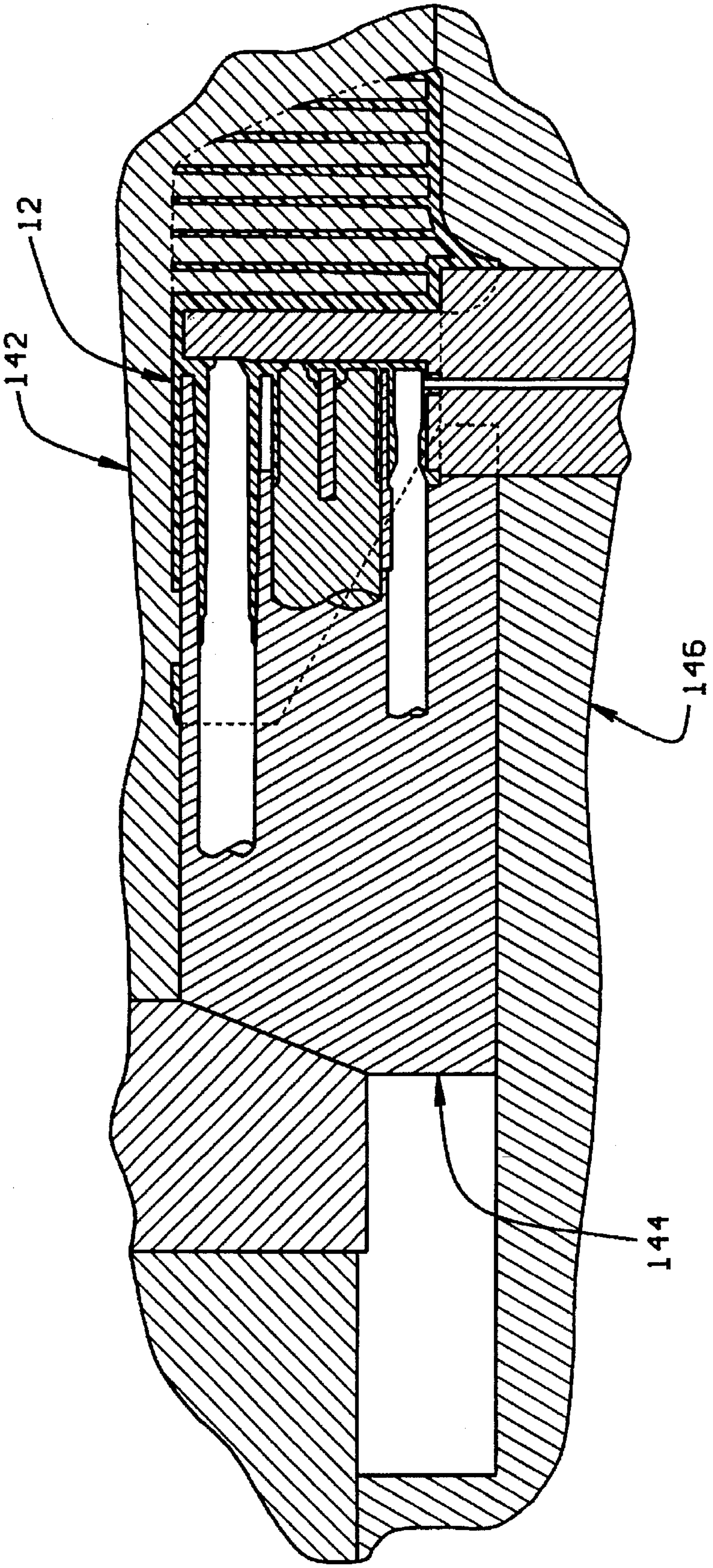
FIG. 6 is a schematic representation of the three mold sections employed in molding the one-piece housing.

FIG. 6 shows the mold assembly employed in constructing the one-piece trigger sprayer housing according to the method of the invention. In the description of the mold assembly and its method of use to follow, directional terms such as "upwardly", "downwardly", leftwardly" and "rightwardly" are used. It should be understood that these terms are used as illustrative only, and that the directions of movement of the mold assembly sections relative to each other and relative to the one-piece sprayer housing should not be limited to the specific directions used in the description. The mold assembly is basically comprised of three mold sections, a top mold section 142, a forward mold section 144, and a bottom mold section 146. The three mold sections come together in a manner to be explained to form a hollow void between the three sections into which molten plastic is injected or extruded to form the one-piece trigger sprayer housing the present invention. In FIG. 6, the one-piece housing 12 is shown molded between the three mold sections. Only those portions of the three mold sections that mold the interior chambers and exterior surface configurations of the one-piece housing are shown in FIG. 6. The remaining portions of the three mold sections are operatively connected to conventional machinery employed in moving the three sections relative to each other in bringing the three sections together to form the hollow void used in molding the one-piece trigger sprayer housing 12, and to move the three mold sections apart to enable removal of the molded one-piece housing from the mold sections.

Figure 9:
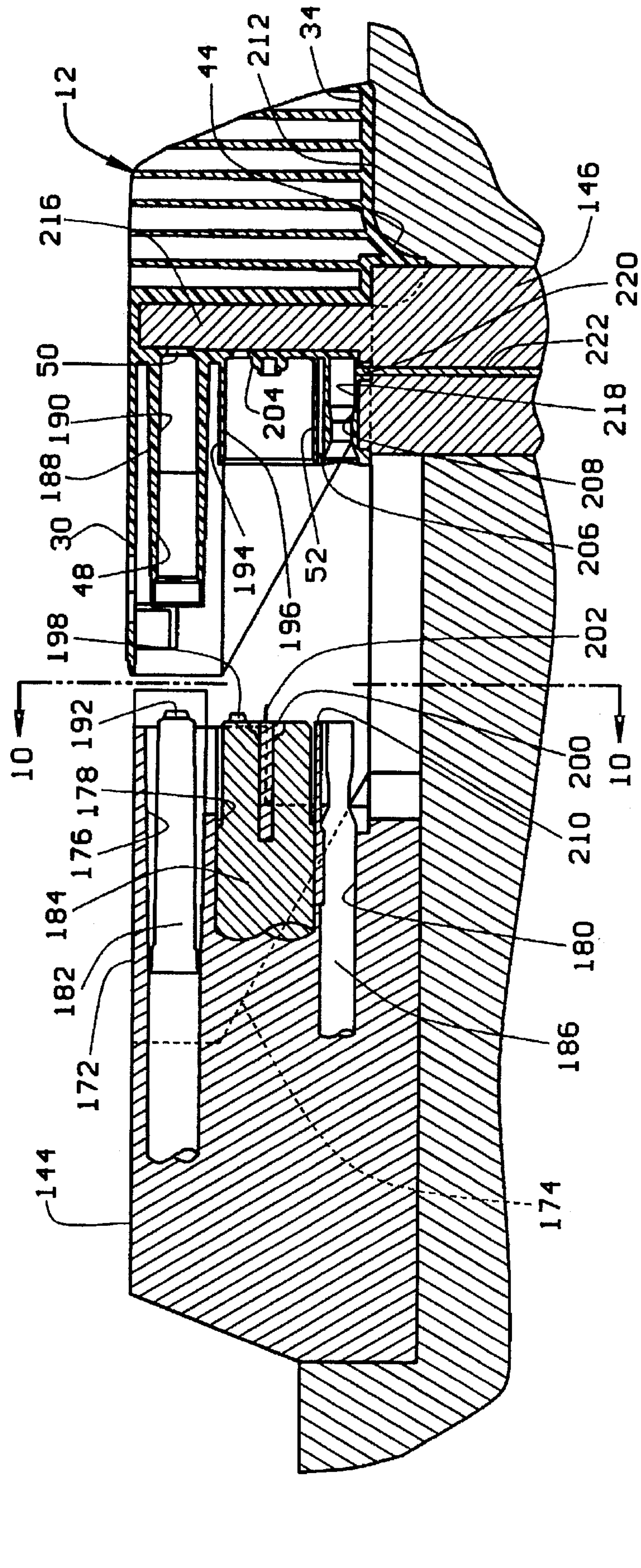
FIG. 9 is a representation of the forward and bottom mold sections.

In disassembling the three mold sections from each other, the top mold section 142 is first moved vertically upward relative to both the forward mold section 144 and the bottom mold section 146 from their relative molding positions shown in FIG. 6. With the top mold section 142 removed upwardly, the forward mold section 144 may then be slid to the left over the bottom mold section 146 as shown in FIGS. 6 and 9, removing the forward mold section 144 from the trigger sprayer housing 12 formed on the bottom mold section. With the forward mold section 144 displaced to the left, the molded trigger sprayer housing 12 may then be removed from the top of the bottom mold section 146 completing the removal of the trigger sprayer housing from the molding assembly.

Figure 7:
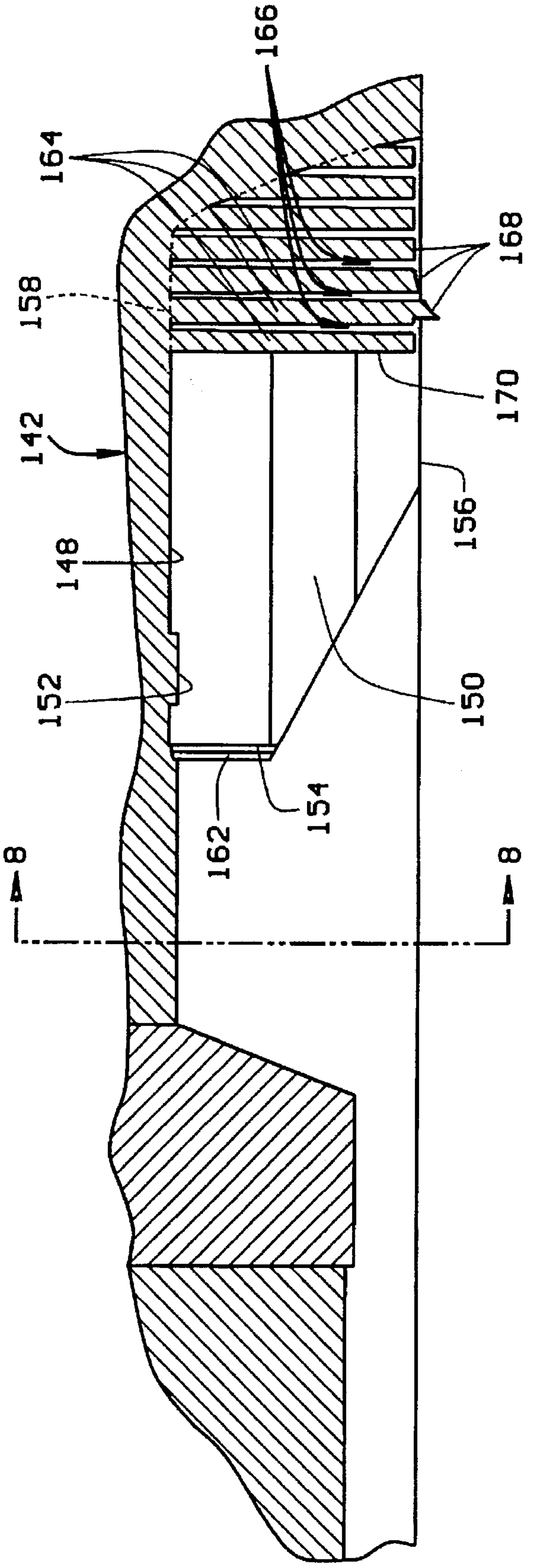
FIG. 7 is a representation of the top mold section.
Figure 8:
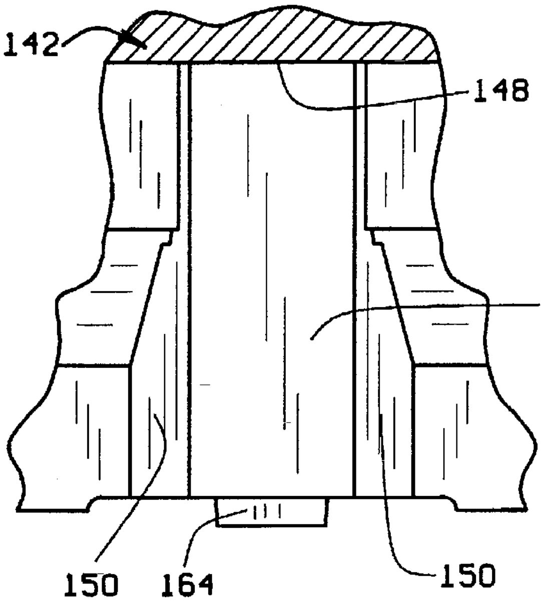
FIG. 8 is a representation of the top mold section viewed from the line 8—8 of FIG. 7.

FIGS. 7 and 8 show the top mold section 142 removed from the forward and bottom mold sections. The top mold section has interior surface configurations that mold the exterior surfaces of a forward portion of the trigger sprayer shroud. The shroud covers over the interior chambers of the one-piece housing that are molded by the forward and bottom mold sections. The interior surface configurations of the top mold section include a top interior surface 148 that molds the top exterior surface configuration of the shroud forward portion, and side panel interior surface configurations 150 that mold the continuous exterior surface configurations of the left and right sides of the trigger sprayer shroud forward portion.

The top interior surface 148 has a downwardly extending projection 152 that molds the nozzle detent opening 102 in the top surface of the trigger sprayer shroud. Apart from this one opening, the remainder of the top surface of the trigger sprayer shroud forward portion is molded as a continuous, smooth surface by the top mold section 142.

Only one of the side panel interior surface configurations of the top mold section is shown in FIG. 7. The side panel interior surface configuration 150 molds the right side panel 32 of the trigger sprayer shroud. It should be apparent that the right side panel 32 of the shroud formed by the top mold section 142 is a mirror image of the left side panel of the shroud and the interior surface configurations of the top mold section used in molding the shroud left side panel exterior surface are a mirror image of the right side panel interior surface configuration 150 shown in FIG. 7.

The side panel interior surface configuration 150 of the mold has a forward edge 154 that extends downwardly from the mold top interior surface 148, and then extends downwardly and rearwardly to a bottom edge 156 of the mold side panel interior surface. The side panel interior surface 150 also has a top edge 158 that extends rearwardly from the top interior surface 148 of the mold. The top edge 158 merges continuously into a rearward edge 160 of the mold's side panel interior surface configuration 150. Together, the mold top interior surface, 148, and the forward edge 154, bottom edge 156, top edge 158 and rearward edge 160 of the mold's side panel interior surface configuration 150 define the perimeter of the continuous exterior surface of the shroud right side panel formed by the top mold section 142.

At the forward edge of the shroud configurations formed in the interior surface of the mold top section 142 is an interior shoulder surface 162 of the mold top section 142 that is configured to form a shoulder on the front edges of the shroud top panel and left and right side panels. The shoulder formed by the interior shoulder surface 162 fits into the nozzle assembly 16 when assembling the nozzle assembly to the housing.

At the rearward portion of the mold top section 142 are a plurality of downwardly projecting spines 164. The spines 164 project downwardly from the mold section top interior surface 148 and form the individual hollow cells 40 in the hollow cavity formed in the rearward portion of the trigger sprayer shroud. Each of the spines 164 has a rectangular cross-section and does not extend laterally across the top mold section 142. The interior surface configuration that forms the shroud side panel 150 extends rearwardly behind the plurality of spines 164 shown in FIG. 7. Between adjacent spines are a plurality of vertical openings 166 that traverse across the top mold section 142. The openings 166 form a plurality of ribs that extend across the hollow cavity formed in the rearward portion of the trigger sprayer shroud by the top mold section 142. The ribs 38 Join together mutually opposed interior surfaces of the rearward portions of the shroud side panels 32 formed by the top mold section. Bottom surfaces 168 of each of the spines 164 mold the top surface of the shroud bottom panel or saddle 34. A forward facing surface 170 of the forwardmost spine 164 forms or molds the rearwardmost surface of the trigger sprayer shroud that separates the hollow cavity formed in the rearward portion of the shroud from the three horizontally oriented chambers and one vertically oriented interior chamber of the shroud.

From reviewing FIG. 7, it can be seen that after the top panel interior surface 148, side panel interior surfaces 150 and the exterior surfaces of the plurality of spines 164 have molded the exterior surface configurations of the trigger sprayer shroud, the molded shroud may be easily removed from the mold top section 142 by moving the mold section upwardly relative to the molded shroud. The top interior surface 148, and side panel interior surfaces 150 of the mold top section 142 will easily separate from the exterior surfaces of the trigger sprayer shroud formed by these interior surfaces. In a like manner, the plurality of spines 164 will separate from the exterior surfaces of the molded trigger sprayer shroud that surround the open cells 40 formed in the hollow cavity in the rearward portion of the shroud as the plurality of the spines 164 are moved upwardly relative to the molded shroud.

Figure 10:
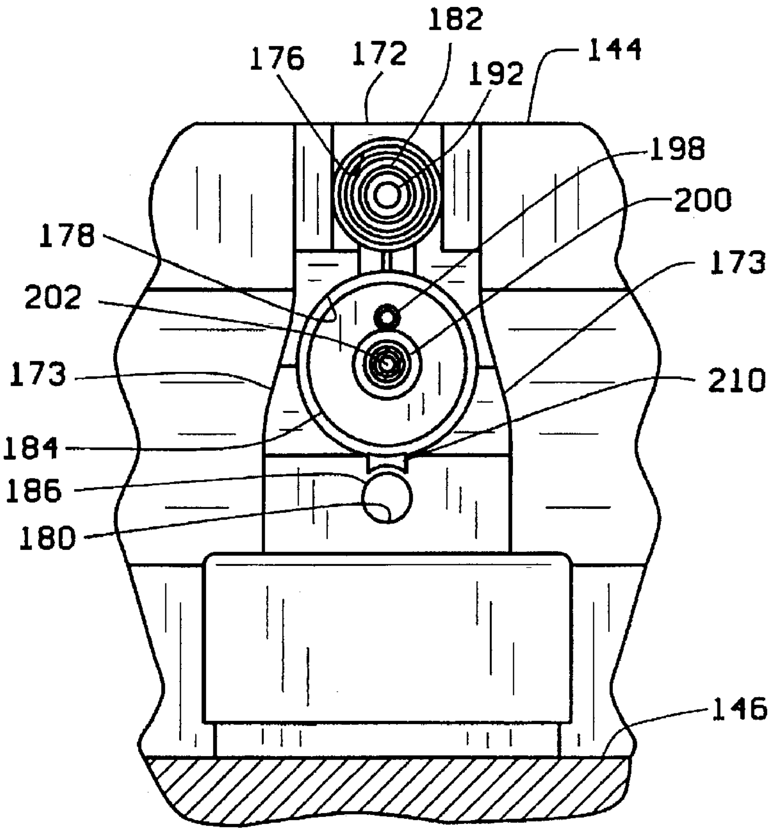
FIG. 10 is a representation of the forward mold section viewed from the line 10—10 of FIG. 9.

FIGS. 9 and 10 show the mold assembly with the mold top section removed from the molded trigger sprayer housing 12, and the forward mold section 144 retracted leftwardly relative to the bottom mold section 146 and the trigger sprayer housing. On the exterior surface of the forward mold section 144, a top portion 172 of the forward section forms the interior surface of the shroud top panel, and opposite left and right exterior surfaces 173 of the forward section form the interior surfaces of the left and right shroud side panels

32. The forwardmost edge, or left hand edge, of the forward mold section exterior surface that forms the interior surface of the shroud right side panel on the trigger sprayer is depicted by a dashed line 174 in FIG. 9.

The right hand end face of the forward mold section 144 has three cylindrical holes 176, 178, 180 formed therein. These three holes mold the exterior, cylindrical surface configurations of the sprayer housing outlet barrel 48, pump chamber 52, and vent chamber 56, respectively. A cylindrical pin 182, 184, 186 is inserted into each of the cylindrical holes of the outlet barrel 176, the pump chamber 178 and the vent chamber 180, respectively. These respective pins mold the interior surface configurations of the sprayer housing outlet barrel 48, pump chamber 54 and vent chamber 56, respectively. On closer inspection of the outlet barrel chamber cylindrical hole 176 and pin 182 inserted into the hole, it can be seen that their respective interior and exterior surfaces mold the configuration of the respective exterior surface 188 and interior surface 190 of the outlet barrel integrally formed in the trigger sprayer housing. The pin 182 is provided with a protrusion 192 at its distal end that forms the primary valve seat 50 at the inlet end of the outlet barrel 48.

In a like manner, the interior surface of the forward mold section hole 178 and the exterior surface of its associated pin 184 mold the exterior 194 and interior 196 surfaces, respectively, of the pump chamber 52. As seen in FIG. 9, the right-hand end face of the pump chamber pin 184 has a projection 198 extending therefrom. The projection 198 molds the pump chamber opening 54 in the back wall of the pump chamber. A recess 200 is formed in the center of the end face of the pump chamber pin 184 and a second pin 202 is received in the recess. Together, the recess 200 and second pin 202 mold the projection 204 in the pump chamber end wall on which seats the coil spring 124 that biases the pump piston 120.

It should also be apparent that the exterior surface of the vent chamber pin 186 forms the interior surface 208 of the vent cylinder chamber 56. As best seen in FIG. 10, a semi-circular projection 210 on the forward mold section 144 forms only the top portion of the vent chamber exterior surface 206. The remainder of the cylindrical vent chamber exterior surface is formed by a portion of the bottom mold section 146 as will be explained.

Each of the interior chambers of the trigger sprayer housing formed by the forward mold section 144, i.e., the outlet barrel chamber 48, pump cylinder chamber 52 and vent passage cylinder chamber 56, are formed with parallel center axes that extend substantially horizontally as viewed in FIG. 9. This arrangement of the center axes of these three chambers permits the forward mold section 144 to be easily removed from the forward portion of the trigger sprayer housing 12 molded by the three-piece mold assembly. The forward mold section is removed by translating the forward mold section 144 to the left relative to the bottom mold section 146 and the trigger sprayer housing 12. With the mold top section 142 removed from both the forward mold section 144 and bottom mold section 146, and with the forward mold section 144 translated to the left relative to the bottom mold section 146 and the molded trigger sprayer housing 12 as shown in FIG. 9, the molded trigger sprayer housing 12 may be easily removed upwardly from the bottom mold section 146.

The bottom mold section 146 has a rearward, exterior surface configuration 212 that molds the underside of the saddle surface 36 of the rearward portion of the trigger sprayer housing. The exterior surface 212 of the bottom section rearward portion forms the bottom panel 34 of the trigger sprayer housing rearward portion. The plurality of ribs 38 molded by the top mold section rearward portion project upwardly from the bottom panel or saddle 34. The fillet 44 formed at the forward edge of the saddle is also molded by the top exterior surface configuration of the rearward portion of the bottom mold section 146.

Just in front of the fillet 44, the bottom mold section 146 has a vertically extending pin 216. The vertical pin 216 has an exterior surface configuration that molds the interior surface of the vertical inlet passage receptacle 46 of the trigger sprayer housing. As seen in FIG. 9, the exterior surface configuration of the bottom mold section vertical pin 216 communicates the inlet passage receptacle 46 with the pump chamber 52 through the pump chamber opening 54 and the outlet barrel 48 through the primary valve seat 50.

Just forward of the vertical pin 216, the bottom mold section 146 has a semi-circular exterior surface configuration 218 that, together with the semi-circular projection 210 of the forward mold section 144, forms the exterior surface 206 of the vent passage cylinder 56. When the forward mold section 144 is moved to the right as shown in FIG. 9, the semi-circular projection 210 on the forward mold section is received in the semi-circular projection 218 of the bottom mold section 146 and together these semi-circular projections form a circular mold that forms the exterior surface 206 of the vent passage cylinder 56.

At the rearward end of the semi-circular projection 218 on the bottom mold section 146 is a cylindrical recess 220. A second pin 222 extends vertically upward through the bottom mold section in the center of the cylindrical recess 220. Together, the second pin 222 and cylindrical recess 220 mold the vent opening 60 in the back of the vent passage cylinder 56.

As can be seen in FIG. 9, the configurations of the exterior surfaces the exterior surfaces of the bottom mold section 146 and of the vertical pins 216, 222 enable the molded one-piece trigger sprayer housing 12 to be removed from the bottom mold section 146 by moving the housing vertically upwardly relative to the bottom mold section as viewed in FIG. 9. The completed mold of the one-piece housing 12, including its exterior shroud and rearward cavity and its interior chambers, may be easily removed from the bottom mold section by moving the housing vertically upwardly relative to the mold section.

With the mold sections described above and their ability to move relative to each other and relative to the molded one-piece housing, it can be seen how the unique constructions of each of the three mold sections forms the one-piece trigger sprayer housing with its aesthetically pleasing exterior shroud and ergonomic saddle integrally formed with its outlet barrel 48, pump chamber cylinder 52, vent passage cylinder 56 and inlet passage receptacle 46. Furthermore, the specific configurations of the three mold sections enable them to be easily removed from the molded one-piece housing 12 and the housing removed from the mold. Although the trigger sprayer housing described above is illustrated as being used with an internally threaded cap closure 84, it should be understood that the same one-piece housing construction may be formed with a bayonet-type connector for attaching the one-piece housing to a liquid container.

Most of the components of the trigger dispenser of the preferred embodiment are plastic. However, the coil spring and ball valve body may be metallic to improve their performance. Because the housing integrally incorporates so many features, fewer component parts are required in the preferred embodiment of the present invention than in many prior art trigger dispensers. Reduction in the number of component parts inherently reduces the handling and assembly costs of manufacturing the dispensers. Because an integral shroud is provided with a sleek appearance, aesthetics are improved over many prior art one-piece housing trigger dispensers. Additionally, because the saddle incorporates a surface to rest upon the user's hand, the trigger dispenser of the present invention is more comfortable to use than other shrouded one-piece housing designs with aesthetic appeal comparable to the present invention. Therefore, the present invention overcomes the problems inherent in prior art trigger dispensers.

While the present invention has been described by reference to a specific embodiment, it should be understood that modifications and variations of the invention may be constructed without departing from the scope of the invention defined in the following claims.

What is claimed is:

1. A method of making a one-piece trigger sprayer housing, the method comprising:

forming a first cylindrical interior chamber in a forward portion of the trigger sprayer housing by molding the first interior chamber on a first cylindrical exterior surface configuration of a forward mold section, and molding the first interior chamber with a horizontal center axis;

forming a second cylindrical interior chamber in the forward portion of the trigger sprayer housing by molding the second interior chamber on a second cylindrical exterior surface configuration of the forward mold section, and molding the second interior chamber with a horizontal center axis; and the center axes of the first interior chamber and the second cylindrical interior chamber are parallel to each other whereby the first and second interior chambers of the trigger sprayer housing are removed from the first and second cylindrical exterior surfaces of the forward mold section by moving the trigger sprayer housing horizontally rearwardly relative to the forward mold section.

2. The method of claim 1, further comprising the step of:

molding a shroud over the trigger sprayer housing integrally with the first and second interior chambers, the shroud having left and right side panels on opposite left and right sides of the first and second interior chambers, and the left and right side panels have continuous exterior surfaces that shield the first and second interior chambers from view from opposite left and right sides of the trigger sprayer.

3. The method of claim 2, further comprising the step of:

molding the shroud in a first interior surface configuration recessed into a top mold section that surrounds the forward mold section, where the shroud of the trigger sprayer housing is removed from the first interior surface of the top mold section by moving the trigger sprayer housing vertically downwardly relative to the top mold section.

4. The method of claim 3, wherein:

the forward mold section and the top mold section are separate mold sections that move independently of each other.

5. The method of claim 1, further comprising the step of:

forming a bottom panel with an exterior saddle surface on an underside of a rearward portion of the trigger sprayer housing by molding the saddle surface on a planar exterior surface configuration of a bottom mold section, the saddle surface extends horizontally rearwardly from the first and second interior chambers of the trigger sprayer housing, and the saddle surface of the trigger sprayer housing is removed from the first exterior surface of the bottom mold section by moving the trigger sprayer housing vertically upwardly relative to the bottom mold section.

6. The method of claim 5, further comprising the step of:

molding the saddle surface on the trigger sprayer housing with the saddle surface positioned vertically below the first and second interior chambers.

7. The method of claim 5, further comprising the step of:

molding the bottom panel on the trigger sprayer housing with a hollow cavity in the trigger sprayer housing vertically above the bottom panel and with the bottom panel positioned horizontally rearwardly of the first and second interior chambers of the trigger sprayer housing.

8. The method of claim 7, further comprising the step of:

forming the cavity in the housing by molding the trigger sprayer housing on an exterior surface configuration of at least one downwardly projecting spine of a top mold section that is positioned vertically above the first exterior surface configuration of the bottom mold section when molding the trigger sprayer housing, where the trigger sprayer housing is removed from the exterior surface of the top mold section by moving the trigger sprayer housing vertically downwardly relative to the top mold section.

9. The method of claim 8, further comprising the step of:

molding a shroud over the trigger sprayer housing integrally with the first and second interior chambers and the bottom panel, the shroud having left and right side panels on opposite left and right sides of the first and second interior chambers, the left and right side panels having bottom edges that extend continuously into the bottom panel of the trigger sprayer housing.

10. The method of claim 9, further comprising the step of:

molding the shroud in a recessed interior surface configuration of the top mold section that surrounds the forward mold section and is spaced forwardly of the exterior surface configuration of the top mold section spine that forms the cavity in the trigger sprayer housing, where the shroud is removed from the interior surface of the top mold section by moving the trigger sprayer housing vertically downwardly relative to the top mold section.

11. A method of making a one-piece trigger sprayer housing, the method comprising:

forming a first cylindrical interior chamber in a forward portion of the trigger sprayer housing by molding the first interior chamber on a first cylindrical exterior surface configuration of a forward mold section, and molding the first interior chamber with a horizontal center axis;

forming a second cylindrical interior chamber in the forward portion of the trigger sprayer housing by molding the second interior chamber on a second cylindrical exterior surface configuration of the forward mold section, and molding the second interior chamber with a horizontal center axis with the center axes of the first and second interior chambers being parallel to each other; and forming a planar bottom panel with an exterior saddle surface on an underside of a rearward portion of the trigger sprayer housing by molding the saddle surface on a first planar exterior surface configuration of a bottom mold section, the saddle surface is molded integrally with and extends horizontally rearwardly from the first and second interior chambers of the trigger sprayer housing.

12. The method of claim 11, wherein:

the center axes of the first and second interior chambers are parallel to each other whereby the first and second interior chambers of the trigger sprayer housing are removed from the first and second exterior surfaces of the forward mold section by moving the trigger sprayer housing horizontally rearwardly relative to the forward mold section, and the saddle surface of the trigger sprayer housing is removed form the first exterior surface of the bottom mold section by moving the trigger sprayer housing vertically upwardly relative to the bottom mold section.

13. The method of claim 12, wherein:

the forward mold section and the bottom mold section are separate mold sections that move independently of each other.

14. The method of claim 11, further comprising the step of:

forming a third cylindrical interior chamber in a middle portion of the trigger sprayer housing by molding the third interior chamber on a second cylindrical exterior surface configuration of the bottom mold section, the third interior chamber communicates with at least one of the first and second interior chambers and has a center axis oriented at an angle relative to the center axes of the first and second chambers.

15. The method of claim 14, wherein:

the first interior chamber is an outlet barrel of the trigger sprayer housing, the second interior chamber is a pump cylinder of the trigger sprayer housing, and the third interior chamber is an inlet passage of the trigger sprayer housing.

16. The method of claim 11, wherein:

the bottom panel is formed on the trigger sprayer housing positioned vertically below the first and second interior chambers.

17. The method of claim 11, further comprising the step of:

molding left and right side panels of a shroud integrally on the trigger sprayer housing with the left and right side panels positioned on opposite left and right sides of the first and second interior chambers and opposite left and right sides of the bottom panel, the left and right side panels extending upwardly from the bottom panel and together with the bottom panel defining a hollow cavity in the trigger sprayer housing that is open at the top of the trigger sprayer housing.

18. The method of claim 17 further comprising the step of:

molding exterior surfaces of the left and right side panels on an interior surface configuration that is recessed into a top mold section, and molding interior surfaces of the left and right side panels that together with the bottom panel define the hollow cavity on an exterior surface configuration of at least one spine that projects downwardly from the top mold section, where the exterior surfaces of the left and right side panels are removed from the interior surface configuration of the top mold section and the interior surfaces of the left and right side panels are removed from the exterior surface configuration of top mold section by moving the trigger sprayer housing vertically downwardly relative to the top mold section.

19. The method of claim 18, further comprising the step of:

molding the hollow cavity in the trigger sprayer housing rearwardly of the first and second interior chambers.

20. The method of claim 17, further comprising the steps of:

forming a third cylindrical interior chamber in a middle portion of the trigger sprayer housing between the first and second interior chambers and the hollow cavity, forming the third interior chamber by molding the third interior chamber on a second cylindrical exterior surface configuration of the bottom mold section, the third interior chamber communicates with at least one of the first and second interior chambers and has a center axis oriented at an angle relative to the center axes of the first and second chambers.

* * * * *